May 15, 1934.  H. D. FLEGEL  1,958,570
FRUIT JUICE EXTRACTOR
Original Filed July 2, 1928  4 Sheets-Sheet 1
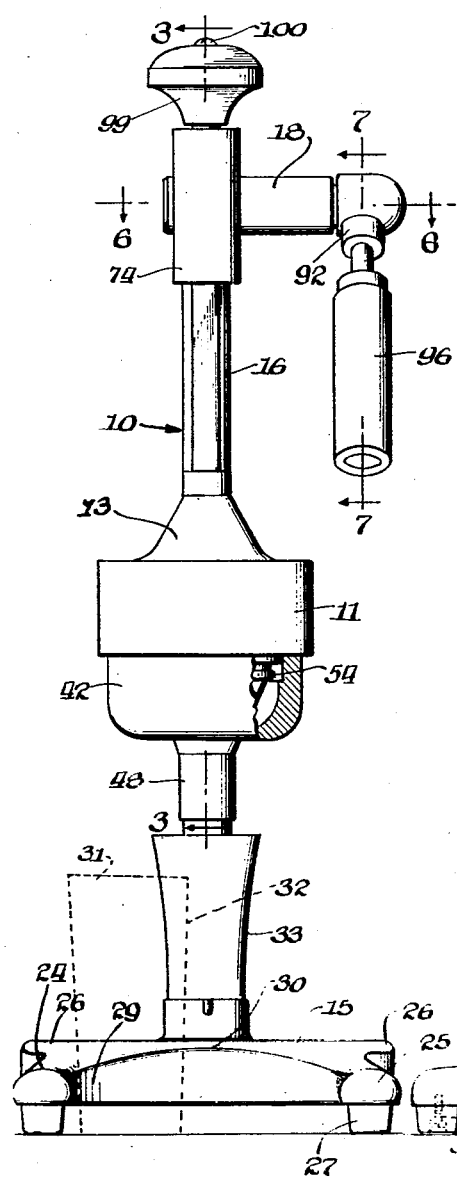
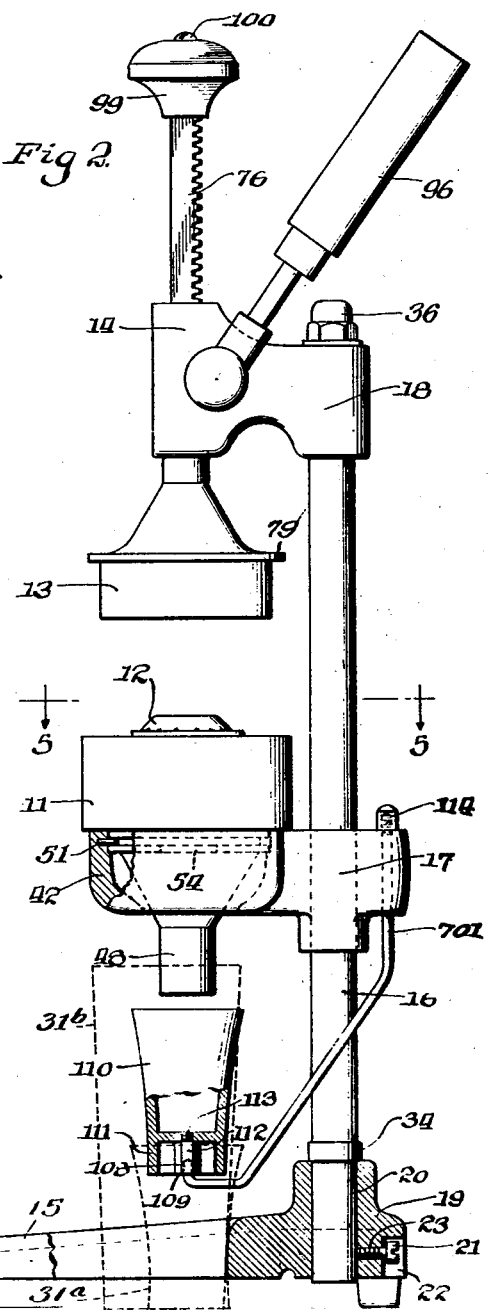
Inventor
Harrison D. Flegel
By Williams, Bradbury,
McClain & Kindle
Attys May 15, 1934.　　　H. D. FLEGEL　　　1,958,570
FRUIT JUICE EXTRACTOR
Original Filed July 2, 1928　　4 Sheets-Sheet 2
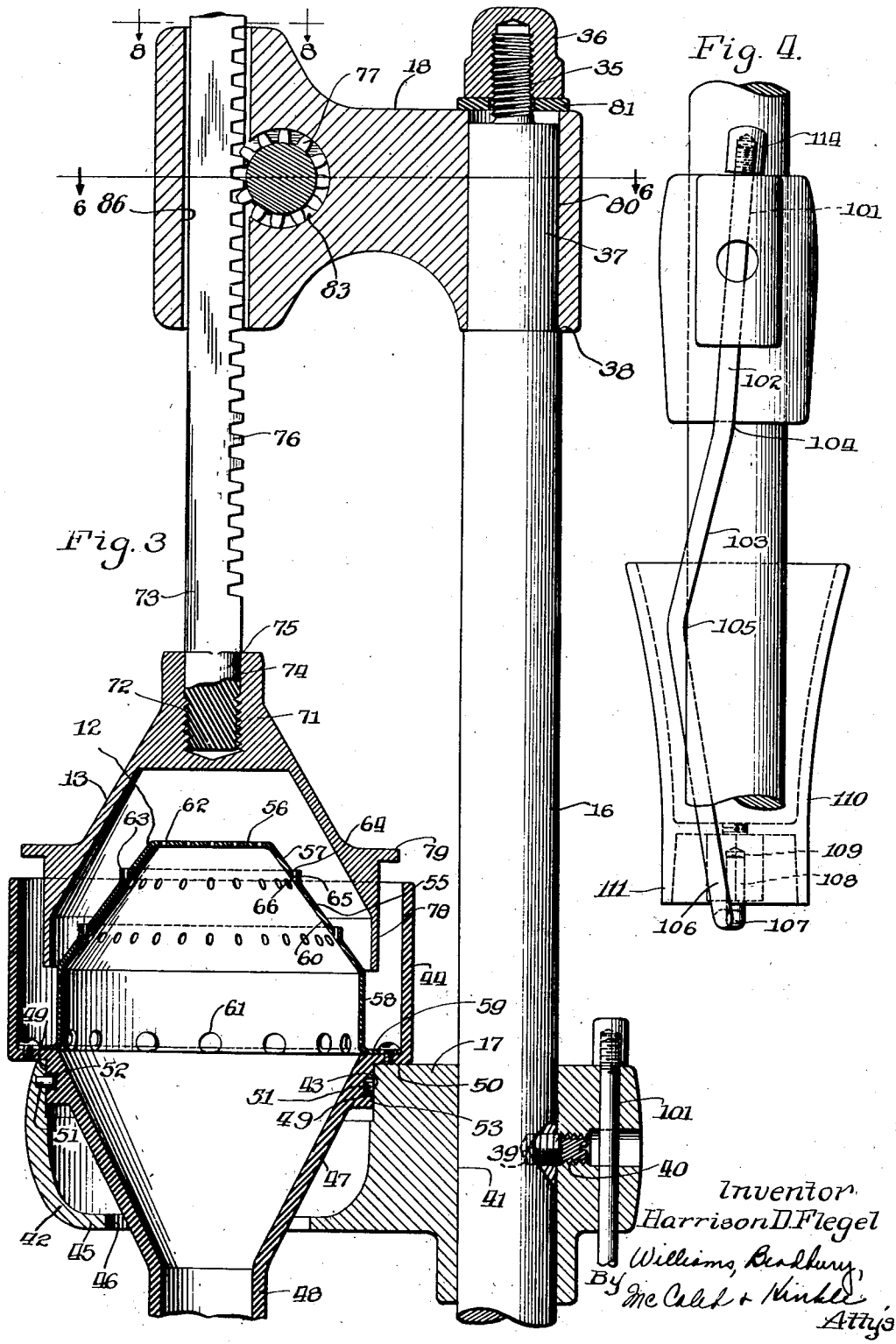

May 15, 1934.   H. D. FLEGEL   1,958,570
FRUIT JUICE EXTRACTOR
Original Filed July 2, 1928   4 Sheets-Sheet 3

Inventor
Harrison D. Flegel
By Williams, Bradbury,
McCaleb & Hinkle
Attys.

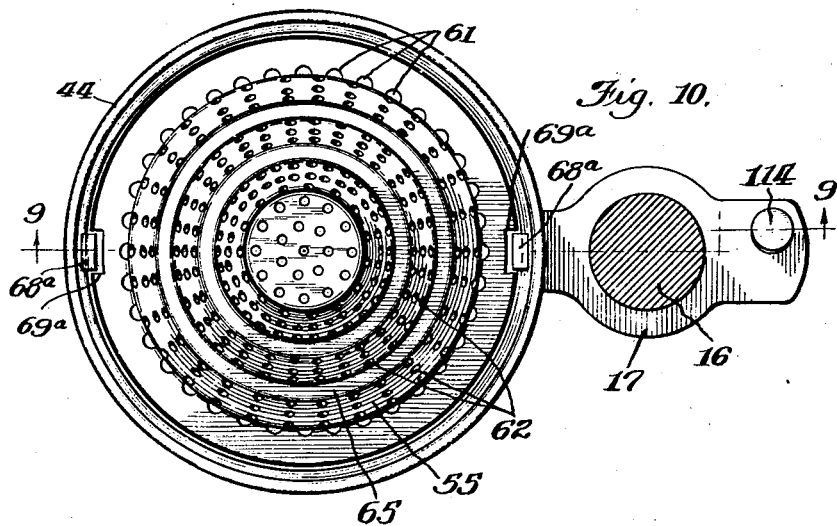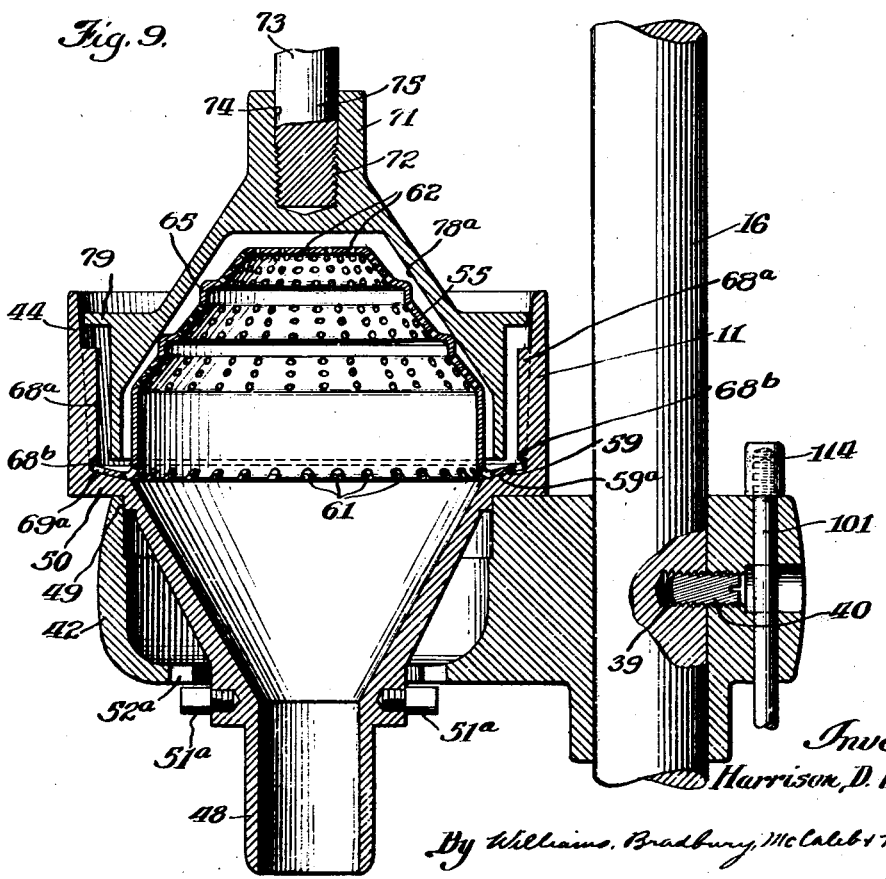

Patented May 15, 1934

1,958,570

UNITED STATES PATENT OFFICE 1,958,570

FRUIT JUICE EXTRACTOR

Harrison D. Flegel, Racine, Wis., assignor, by mesne assignments, to Hamilton Beach Manufacturing Company, Racine, Wis., a corporation of Wisconsin Application July 2, 1928, Serial No. 289,725
Renewed July 11, 1932

9 Claims. (Cl. 100—42)

The invention relates to fruit juice extractors of the type used in drug stores, soda fountains, hotels, restaurants, and in the home.

The objects of the present invention are to provide a fruit juice extractor which is capable of extracting substantially all of the juice from fruits, such as oranges and the like, together with finely divided portions of pulp and the essential oils from the skin of the orange; which embodies quickly adjustable means for bringing a pair of squeezing members into engagement with the fruit, and force multiplying means for accomplishing the extraction of the juice from the fruit and the essential oils from the skin, extracting and treating the pulp so that it is palatable and at the same time straining the juice so that the seeds and large pieces of pulp are not present in the product of the extractor; which embodies a novel drip cup which is biased to drip receiving position and is automatically moved out of the way by the placing of another container in position to receive the juice; which embodies a novel juice extracting device for citrus fruits including a pair of frusto-conical squeezing members for squeezing out the fruit juice and discharging the same through a plurality of apertures in one of said squeezing members, said latter squeezing member being provided with means for preventing the spreading of the fruit skin so that the entire skin and pulp will be trapped between the squeezing members before the maximum pressure is exerted upon the squeezing members; which embodies a supporting structure which is simple, rigid, and can be produced at a low cost; which is more economical, more durable, and more expeditious and efficient in the extraction of juices; which is adapted to be kept closed so as to exclude insects and prevent the drying of the juices remaining in the extractor; and which may readily be taken apart for cleaning and cleansed with facility.

Other objects and advantages of the invention will be apparent from the following description and the accompanying drawings in which similar characters of reference indicate similar parts throughout the several views.

Figure 5:
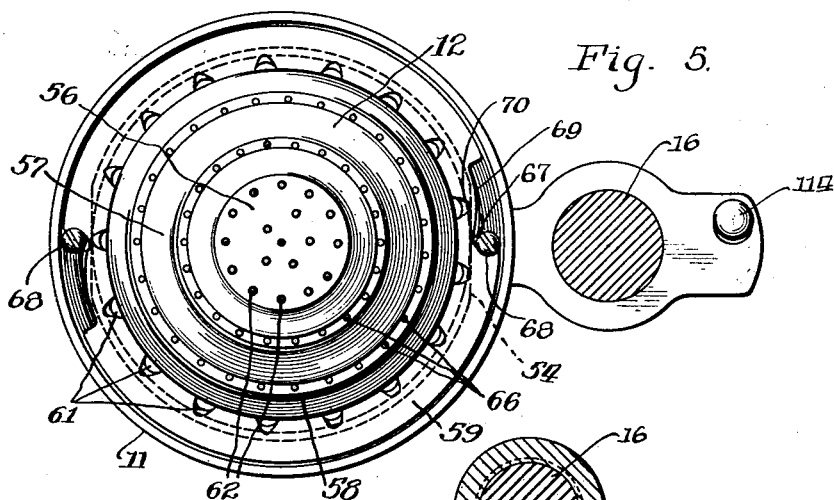
Figure 7:
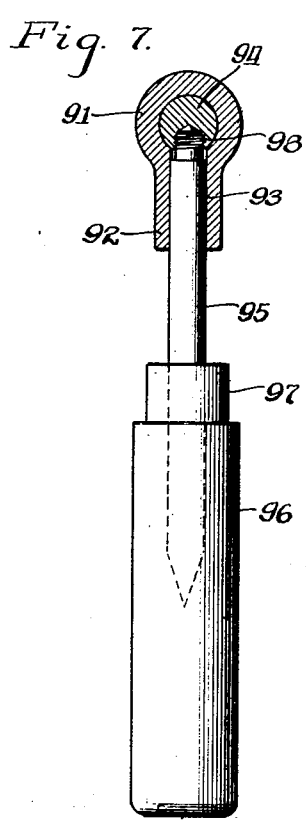
Figure 6:
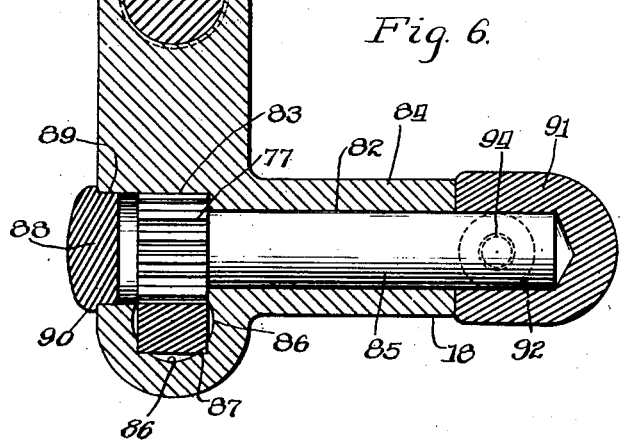
Figure 8:
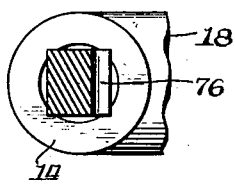

Fig. 1 of the drawings is a front elevation of a fruit juice extractor embodying the invention, parts being broken away to show the interior structure; Fig. 2 is a side elevation, parts being shown in section and the upper squeezer member being shown in its raised position; Fig. 3 is a medial cross section on the line 3—3 of Fig. 1 through the squeezing members and actuating mechanism; Fig. 4 is a rear elevation of the drip cup and its support; Fig. 5 is a plan of the male squeezer member and its supporting receptacle taken on line 5—5 of Fig. 2; Fig. 6 is an enlarged detail section of the force multiplying mechanism taken on line 6—6 of Fig. 3; Fig. 7 is a medial cross sectional view of the handle; Fig. 8 is a cross section taken on line 8—8 of Fig. 3; Fig. 9 is a medial cross sectional view similar to Fig. 3, showing the preferred form of the squeezing members and juice receptacle; Fig. 10 is a plan of the squeezer member and receptacle of Fig. 9.

In the exemplification of the invention illustrated in Figs. 1 to 8, the juice extractor 10 comprises a supporting structure, a receptacle 11 for receiving the expressed juice, a male squeezer-member 12 in said receptacle, and a vertically slidable female squeezer member 13. The supporting structure comprises a cast metal base 15, a substantially cylindrical rod or shaft 16 which may be tubular and constitutes an upright, a cast metal bracket 17 fixed on the shaft and projecting forwardly therefrom for supporting the receptacle 11 which carries the male squeezer-member 12, and a cast metal supporting and bearing bracket 18 which is secured to the upper end of rod 16 and projects forwardly therefrom and carries the movable squeezer-member 13 and the operating mechanism therefor.

Base 15 comprises a pair of forwardly extending sides or arms 24, 25, the inside surface 29 of which is gradually curved toward the central part 30 to guide and position juice receptacles of sizes, as exemplified by tumblers 31, 31ª, and 31ᵇ, into position to receive the juice from the receptacle 11. Rubber feet 27 are secured by countersunk screws 28 to the corners of the base 15. The base is adapted to rest on a table or counter.

The base 15 comprises a body 19 having a vertically extending bore 20, in which the lower end of the rod 16 is fitted. The rod 16 has a shoulder 34 engaging the top of body 19 of the base. A set screw 21, disposed in a recess 22 in the base, leads through a threaded aperture 23 to fixedly secure the rod 16 in its upright position in the base 15.

The bracket 17 may be of cast metal and has an elongated bore 41 in which the rod 16 is fitted. A countersunk screw 40 is threaded to the portion of bracket 17 which surrounds the rod 16 and extends into a threaded hole 39 in the back of the rod 16 to secure removably the bracket 17 on the rod. This rod 16 may be provided with a plurality of threaded holes 39 located at intermediate points in the back of the rod 16 to receive the screw 40 and to support the bracket 17 at different elevations. Bracket 17 comprises a forwardly extending integral annular or ring-like member 42 provided with a cylindrical portion 43 into which fits a portion of the receptacle 11, and an inwardly extending bottom flange 45 with a central opening 46 for the lower end of the discharge hopper 47 of the juice-receptacle 11.

The rear end of bearing-bracket 18 has a vertical bore 80 in which the upper end 37 of the rod 16 above a shoulder 38 is fitted. A cap nut 36 on a screw-thread 35 on the upper end of rod 16 clamps the bracket 17 against shoulder 38 and fixedly secures said bracket on the rod.

The operating mechanism for the movable squeezing-member 13 comprises a vertically slidable bar 73, which is substantially rectangular in cross section, and is provided with a plurality of teeth 76, a pinion 77, a shaft 85 integral with said pinion, and a lever or handle 96 whereby the shaft and pinion may be rotated. The bar 73 is substantially rectangular in cross section, is slidable in a vertical bore 86 in bracket 18, and is fitted in equally spaced angular grooves 87 in which slidably fit the right-angled corners of the bar 73 to prevent rotation of the bar in the bracket 17. Bracket 18 has a transverse bore 82 and a communicating and coaxial counter-bore 83, so there will be an opening through the bracket. The bore 82 extends through a laterally extending cylindrical boss 84 and forms the journal for the shaft 85. The periphery of pinion 77 fits in the counter-bore 83. This integral shaft and pinion are endwise insertable into and removable from the bracket 18. The counter-bore 83 is closed by a plug 88 which has a cylindrical surface 89 in close frictional fit with the counter-bore and an outwardly projecting flange 90. The end of shaft 85, opposite pinion 77, projects beyond the end of boss 84, and a hub 91, having an integral laterally projecting boss 92, is removably secured to the projecting end of the shaft. The boss 92 has a bore 93 for a rod 95 to which is fixed a handle or lever 96 and a ferrule 97. The inner end of rod 95 is screw-threaded into a threaded aperture 94 in the shaft 85. When the rod 95 is secured to the shaft 85, the hub 91 will hold the shaft and pinion against inward axial movement in the bracket 18. By removing the plug 88 and disconnecting rod 95 from the shaft 85, the pinion 77 and shaft 85 can be removed endwise through the counter-bore 83. This exemplifies a construction in which the shaft and pinion may be integrally formed and easily insterted and removed from the bracket 18.

The upper squeezer-member 13 is formed of cast metal, such as aluminum, and has a hub 71 with a threaded socket 72 for the lower threaded end of the rack-rod 73. Socket 72 has a counter-bore 74 to receive the cylindrical portion 75 on rod 73 to conceal the threads between the member 13 and the rod 73. Member 13 has a conoidal wall terminating at its lower end in a cylindrical wall 78 and an annular flange 79 adapted to work in the receptacle 11.

Receptacle 11 has a flat annular shoulder 50 adapted to rest on the top of supporting ring 42, and a cylindrical portion 49 which fits in the portion 43 of ring 42. Receptacle 11 is secured in said ring by a pair of pins 51 which are carried by the ring at diametrically opposite points, and adapted to extend into an annular groove 52 formed in the receptacle at the cylindrical portion 49. The lower flange 53 on receptacle 11, below the groove 52, is cut away to form flat portions 54 diametrically opposite to each other to permit the pins 51 to slide into and out of the groove 52 when the receptacle is rotated to a predetermined position. This forms an interlocking connection between the ring 42 and the receptacle 11 to prevent the receptacle and male squeezer-member from being lifted with the female member when the latter is moved upwardly.

The receptacle 11 comprises a cylindrical wall 44 above the ring 42, adapted to receive the squeezing member 13, and a downwardly tapered extension which terminates in a discharge spout 48 to conduct the expressed juice into the subjacent receiving receptacle.

Receptacle 11 contains and encloses a male squeezing member 55, upon which a portion of the citrus fruit is placed for extraction, and this member consists of a thin sheet metal member having a flat upper surface 56, a substantially frusto-conical surface 57, a cylindrical wall 58, and an outwardly extending lower rim or flange 59. A plurality of annular ridges 65 are formed on the outer frusto-conical surface 57 of member 55, and are provided with apertures 64. The upper face 56 and the conical surface 57 of the squeezing member 55 are provided with series of fine apertures 62 through which the fruit juices, oils, and minute particles of pulp will be forced during the extracting operation. Member 55 is also provided with a series of larger apertures 61 extending into the cylindrical wall 58 adjacent the annular flange 59, and these apertures direct the expressed material from the flange 59 downward into the hopper 47.

Ridges 65 are adapted to aid in preventing the fruit from spreading over the male member to such an extent that the edge of the skin is cut off by the flange 78 and the latter is adapted to cooperate with the cylindrical portion 58 on the member 55 to enclose the fruit between the members before a maximum pressure is exerted upon the fruit. The upper member 13 has an outwardly extending annular flange 79 adapted to fit within the cylindrical portion 44 of receptacle 11 and substantially close the receptacle when the parts are in position shown in Figs. 1 and 9, thereby preventing the juices remaining in the receptacle from drying and closing the extractor to prevent entrance of insects and the like.

The annular flange 59 of squeezing member 55 may be cut away as at 67 with substantially round apertures to clear the heads of screws 68 carried by the receptacle 44 at diametrically opposite points. Apertures 67 lead to circumferentially extending notches 69, and the sides of these notches 69 are curved upwardly, as at 70, to facilitate the removal of the member by rotation in clockwise direction in Fig. 5. This constitutes a detachable interlocking connection between the receptacle 11 and the squeezing member 55.

In the embodiment shown in Figs. 9 and 10, the receptacle 11 is substantially the same form as in Fig. 3, being provided with a flat annular shoulder 50 to rest upon the top of the ring 42 and with a cylindrical portion 49 adapted to fit within the ring. The ring 42 is provided with a pair of notches 52ª for the passage therethrough of a pair of diametrically opposed pins 51ª carried by the discharge spout 48. When the receptacle 11 is rotated to vertically align the pins 51ª and slots 52ª, the receptacle may be inserted into or removed from the ring 42, and when turned to bring the pins beneath the ring 42 the receptacle will be locked against withdrawal from the ring.

In Figs. 9 and 10, the male squeezing member 55 consists of thin sheet metal and comprises a flat top wall 56, a substantially frusto-conical wall 57, a lower cylindrical wall 58 and an annular bottom flange or rim 59. The annular flange 59 extends upwardly at a slight angle, say about 15° to the horizontal, to drain the juice from the receptacle 11 into the hopper. The seat 59a in receptacle 11 for flange 59 is tapered correspondingly to said flange. The walls 56 and 57 of squeezing member 55 are provided with a multiplicity of extremely fine apertures through which the fruit juice, oils and minute particles will escape into the discharge spout of receptacle 11. Larger apertures 61, at the lower end of wall 58 of squeezing member 55, drain the remaining juice into spout 48. Member 55 is made as thin as possible to facilitate cleansing. When this member is made of relatively thin material, the small strands of pulp are easily removable from the apertures 61, 62 by wiping the side or outside of member 55, while if its walls are thick, there is a tendency to clog the apertures 62 with pieces of pulp, etc. which do not project sufficiently to be drawn out by ordinary cleaning.

In Figs. 9 and 10, a pair of inwardly projecting ribs 68a are formed on the inner face of wall 44 and terminate above the seat 59a to leave slots 68b beneath which the flange 59 will pass. Said flange has notches 69a to permit the flange to clear the ribs 68a while inserting or removing the member 55 from the receptacle 11. When the notches 69a are vertically aligned with ribs 68a, member 55 can be removed and replaced into the receptacle 11. When the member is turned so the notches are out of alignment with said ribs, the member will be locked against upward movement in the receptacle 11.

While the interior frusto-conoidal surface 78a of the squeezing member 13 is substantially complementary to the male squeezing member 55, these surfaces are of such relative angularity that the lower portion of the surface 78 comes into contact with the male die before the upper surface, thereby leaving a substantial clearance between the members and the apices of the cones. Thus, the lower portions of the members are adapted to come into contact first so as to enclose the fruit between the squeezing members after which the confined fruit is subjected to an extremely high pressure between the upper portions of the dies. This causes the juice to be entrapped between the squeezing members and forced through apertures in the male member to the discharge hopper.

The drip cup 10 (Fig. 4) is supported upon the standard 16 or the base 15 in such manner that it automatically gravitates to the drip-receiving position and the mechanism for accomplishing this result may be substantially as follows:

Bracket 17 has a bore 101 which is arranged at an angle or slightly transverse to standard 16. The bore 101 rotatably holds the upper end 102 of a drip cup support 103 comprising a rod bent to substantially the form shown in Figs. 2 and 4, that is, laterally and forwardly at the point 104 so as to extend about the rod 16. The rod 103 has another lateral bend at 105 so that the lower end 106 will be located in front of the middle of the standard 16.

The rod 103 also extends forward as at 107 and upward as at 10 directly beneath the spout 48, and the upwardly turned end 108 is adapted to be received in a socket 109 carried by a drip cup 110. The drip cup 110 may comprise a bakelite member having substantially the form of a tumbler with a downwardly projecting member 112.

The member 112 comprises a metal member having a socket 100 to receive the end 108 of the cup supporting member and also having a threaded reduced portion 113 which may be secured in a threaded bore in the bottom of the drip-cup. The rod 103 is also provided with a cap nut 114 at its upper end for supporting its weight in the bearing 101. If desired, the supporting rod for the drip-cup may be downwardly turned to engage in a socket at the rear of the base.

As the rod 103 is journalled upon an oblique axis the cup 110 will rise as it is rotated to the right in Fig. 1 or to the left in Fig. 4, and the cup will naturally gravitate to the position shown in Figs. 1 and 4, the engagement of the rod 103 with the side of the standard 16 serving as a stop to hold the drip cup in proper position beneath the discharge spout 48. The drip cup may readily be cleaned by simply lifting it off the end 108 of the rod and as the cup is automatically moved into drip receiving position the dripping of the fruit juice upon the counter is prevented and the unsanitary conditions resulting from the lack of such cup are eliminated.

The operation of my fruit juice extractor is as follows: Normally the parts are kept in the position shown in Fig. 1 so that the upper die member 13 will close the receptacle 11, preventing the access of insects to the juice remaining in the receptacle and maintaining such juice in a moist condition so that the dies will not become sticky and they will be kept in a sanitary condition although some juice remains in the extractor.

The squeezing member 13 may be quickly moved to the position shown in Fig. 2 by grasping the knob 99 and pulling upward, the handle 96 being free to rotate. A piece of fruit, such as a half orange may then be placed over the squeezing member 12 with the skin uppermost and a tumbler 31 may be placed beneath the spout 38 by following the guide 29, whereupon the receptacle 31 will automatically displace the drip cup 110, the latter swinging to the right in Fig. 1. When the rack is in its uppermost position, the handle will have passed over dead center into the position of Fig. 2, so the handle will maintain the upper squeezing member raised or in position for a new supply of fruit.

A supply of fruit, such as a half orange having been placed upon the lower die as described, the operator will grasp the knob 99 and push downward upon the rack 73 to quickly bring the squeezing members into engagement with the fruit. The handle 96 will then have rotated through slightly more than one revolution and will be pointing upward toward the front where the operator may easily bring considerable force into play in the extracting operation.

By pulling downward upon the handle 96, the pinion 97 will force the rack 73 downward, the upper squeezing member 13 embracing the orange and pressing it against the lower squeezing member 12. As the orange is crushed, the ridges 63 tend to force the orange into the upper member and the lower flange 70 of said member is adapted to come into close engagement with the lower squeezing member, thereby trapping substantially all of the orange between the squeezing members without cutting off the outside rim of the skin. The fruit having been trapped between the squeezing members, the continued movement of the upper squeezing member under the powerful force which may be exerted by the handle 96, will crush the fruit between the squeezing members, squeezing out substantially all of the juice as well as the oil of orange from the skin, and crushing the pulp to such an extent that extremely fine pieces of the pulp are forced through the aperatures 62 together with the juice. The minute particles of pulp which are thus formed are adapted greatly to improve the quality of the juice extracted, while the larger portions of the pulp and seeds are automatically retained within the receptacle 11. During the operation of extraction, such a powerful force is exerted upon the fruit that the juice squirts through the aperatures 62 with a tremendous force, being collected by the frusto-conical portion 47 of the receptacle and discharged through the spout 48 into receptacle 31. The downward movement of the squeezing member 13 is preferably continued until the orange skin is crushed between the squeezing member and a substantial part of the oil or orange squeezed out of the skin. It is this oil which gives the orange its flavor and odor and which it is highly desirable to include in the beverages prepared from the juice.

When extraction has been completed, the upper squeezing member may be quickly lifted by rotating the pinion 77 by means of the handle 96 or by lifting upon the knob 99, and the residue of fruit left in the receptacle 11 may be removed by lifting it out of the receptacle. When the tumbler 31 is removed, the drip cup 110 will automatically gravitate back to the drip receiving position.

This fruit juice extractor is capable of extracting substantially all of the fruit juice and part of the essential oils of a citrus fruit, and is adapted to treat the pulp, reducing a large portion thereof to minute particles which are utilized with the fruit juice and which give it a more palatable flavor. The extractor includes quickly adjustable means for bringing the dies into engagement with the fruit, and force multiplying means for effecting the operation of extraction.

The fruit juice extractor is more efficient and expeditious than the extractors of the prior art and as it requires no motor, it is more economically manufactured and less likely to get out of order. Forming the supporting structure of a rod and cast brackets provides a construction which is rigid, light in weight, and which can be produced at a low cost. The provision of a drip-cup, automatically movable out of and into drip receiving position, prevents unsanitary conditions and enables the operator to extract the juice from the citrus fruits with a minimum of necessary movements, so that an operator may attend to a larger number of customers.

The parts which come in contact with the fruit juice are protected from flies and dust, and when the machine is not being used, these parts may readily be removed and cleaned so as to maintain the extractor in a sanitary condition. These parts are also constructed of material which is non-corrodable and which can withstand the action of the acids present in the fruit juices.

The invention is not to be understood as restricted to the details set forth since these may be modified within the scope of the appended claims, without departing from the spirit and scope of the invention.

Having thus described the invention, what I claim as new and desire to secure by Letters Patent, is:

1. In a fruit juice extractor, the combination of a tapered receptacle having a discharge opening with a squeezing member carried in said receptacle, said squeezing member being of substantially frusto-conical form and having an annular supporting flange, a plurality of ridges on said squeezing member, said squeezing member having a plurality of apertures, a substantially complementary squeezing member for fruit on said first mentioned squeezing member, said complementary member being of frusto-conical form, the curved inner portion of which has a greater pitch than that of the first said squeezing member, such that the members approach more nearly to each other at the lower edge of the conical portions than at the upper edge, for entrapping the fruit therebetween.

2. In a fruit juice extractor, the combination of a tapered receptacle having a discharge opening with a squeezing member carried in said receptacle, said member being of substantially frusto-conical form and having an annular supporting flange, a ridge on the conical surface of said member adjacent the lower edge, said member having a plurality of apertures, a substantially complementary member for squeezing a fruit on said first mentioned member, said complementary member being of frusto-conical form, the curved inner surface of which has a greater pitch than that of the first said member, such that the members approach more nearly to each other at the lower edge of the conical portions than at the upper edge, whereby the ridge on the first said member approaches the conical surface of the complementary member to restrict the spreading of the fruit entrapped thereby.

3. In a fruit juice extractor, the combination of a receptacle having a discharge opening with a squeezing member carried in said receptacle, said member being of substantially frusto-conical form, and having a plurality of apertures, a second member for squeezing fruit on the first said member, said second member being of frusto-conical form, the inclined inner surface of which has a greater pitch than the first said member, such that the members approach more nearly to each other at the lower edge of the conical portion than at the inner edge for entrapping fruit therebetween.

4. In a fruit juice extractor, the combination of a substantially cylindrical cup-shaped member having a centrally located discharge aperture and an annular supporting surface, with a male squeezing member having an annular flange fixed to said annular supporting surface, said member having a cylindrical portion provided with relatively large juice discharging apertures located at said annular flange, said member having a frusto-conical portion provided with a multiplicity of vertically extending discharge apertures and said member having a relatively flat upper surface with discharge apertures.

5. In a fruit juice extractor, the combination of a substantially cylindrical cup-shaped member having a centrally located discharge aperture and an annular supporting surface, with a male squeezing member having an annular flange fixed to said annular supporting surface, said member having a cylindrical portion provided with relatively large juice discharging apertures located at said annular flange, said member having a frusto-conical portion provided with a multiplicity of vertically extending discharge apertures and said members having a relatively flat upper surface with discharge apertures, and a second squeezing member having a frusto-conical depression of different angularity and having a depending cylindrical flange for enclosing and entrapping fruit between said members.

6. In a fruit juice extractor, the combination of a base having a standard, with a bearing carried by said standard, and having its axis at an angle to the vertical, a drip cup supporting member journaled in said bearing, and a drip-cup carried by said supporting member, said bearing being so disposed that the drip-cup is normally urged to drip-receiving position.

7. In a fruit juice extractor, the combination of a base having a standard, with a bearing carried by said standard, and having its axis at an angle to the vertical, a drip cup supporting member journaled in said bearing, and a drip cup carried by said supporting member, said bearing being so disposed that the drip cup is normally urged to drip-receiving position, said bearing being located on one side of the standard, and said supporting member comprising a rod bent to extend around to the opposite side of said standard.

8. In a fruit juice extractor, the combination with a cup-shaped member having a discharge aperture at the bottom thereof, a male squeezing member within the cup, provided with a cylindrical lower portion and a perforated frusto-conical upper portion, a second squeezing member having a frusto-conical socket and a cylindrical lower portion adapted to extend around the cylindrical portion of the male member, and means for shifting one of the members relatively to the other to bring the second squeezing member within the cup and the cylindrical portions of male squeezing members into lapped relation.

9. In a fruit juice extractor, the combination with a cup-shaped member having an annular shoulder and discharge aperture at the bottom thereof, a male squeezing member removably held within the cup and on the shoulder, and provided with a cylindrical lower portion and a frusto-conical upper portion, a second squeezing member having a frusto-conical socket and a cylindrical lower portion adapted to extend around the cylindrical portion of the male member, and means for shifting one of the members relatively to the other to bring the second squeezing member within the cup and the cylindrical portions of the squeezing members into lapped relation.

HARRISON D. FLEGEL.